United States Patent
Berbner et al.

(10) Patent No.: US 6,500,371 B1
(45) Date of Patent: Dec. 31, 2002

(54) CONTINUOUS METHOD FOR PRODUCING AMINO- AND/OR PHENOPLASTS

(75) Inventors: Heinz Berbner, Mörlenbach (DE); Hans Etling, Dannstadt-Schauernheim (DE); Erhard Guenther, Hassloch (DE); Tilman Sirch, Schifferstadt (DE); Hans Dieter Zettler, Grünstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/485,222

(22) PCT Filed: Aug. 13, 1998

(86) PCT No.: PCT/EP98/05159

§ 371 (c)(1),
(2), (4) Date: Feb. 7, 2000

(87) PCT Pub. No.: WO99/08856

PCT Pub. Date: Feb. 25, 1999

(30) Foreign Application Priority Data

Aug. 18, 1997 (DE) .......................................... 197 35 809

(51) Int. Cl.⁷ .......................... B29C 47/76; B29C 47/10
(52) U.S. Cl. .................... 264/101; 264/176.1; 264/204; 264/331.22
(58) Field of Search ................................. 264/101, 102, 264/176.1, 204, 211.24, 13, 331.22

(56) References Cited

U.S. PATENT DOCUMENTS

| 4,026,864 A | * | 5/1977 | Diethelm et al. |
| 4,311,802 A | * | 1/1982 | Gosler et al. |
| 4,386,178 A | * | 5/1983 | Schuette et al. |
| 4,458,062 A | * | 7/1984 | Blasing et al. |
| 4,497,915 A | * | 2/1985 | Horoldt et al. |
| 4,996,289 A | * | 2/1991 | Berbner et al. |
| 5,084,488 A | * | 1/1992 | Weiser et al. |
| 5,162,486 A | * | 11/1992 | Follmann et al. |
| 5,322,915 A | * | 6/1994 | Weiser et al. |
| 5,916,999 A | * | 6/1999 | Berbner et al. |

FOREIGN PATENT DOCUMENTS

| DE | 24 51 874 A1 | * | 5/1975 |
| EP | 0 355 760 A2 | * | 8/1989 |

OTHER PUBLICATIONS

Plastics Engineering Handbook, 4ᵗʰ edition, Joel Frados, Ed., p. 359, 1987.*

* cited by examiner

Primary Examiner—Mark Eashoo
(74) Attorney, Agent, or Firm—Keil & Weinkauf

(57) ABSTRACT

The invention relates to a continuous process for preparing aminoplastics and/or phenolics, in which a precondensate solution is prepared in a first extruder (14), the precondensate solution is continuously fed, with addition of additives, to a second extruder (20) with partial filling in the feed section (E) and devolatilization section (G), devolatilized in the second extruder (20) and then formed to give a molding composition or an end product. The process is particularly suitable for preparing melamine resins, in particular melamine-formaldehyde resins, as well as for preparing urea-formaldehyde resins.

13 Claims, 1 Drawing Sheet

CONTINUOUS METHOD FOR PRODUCING AMINO- AND/OR PHENOPLASTS

Figure 1:
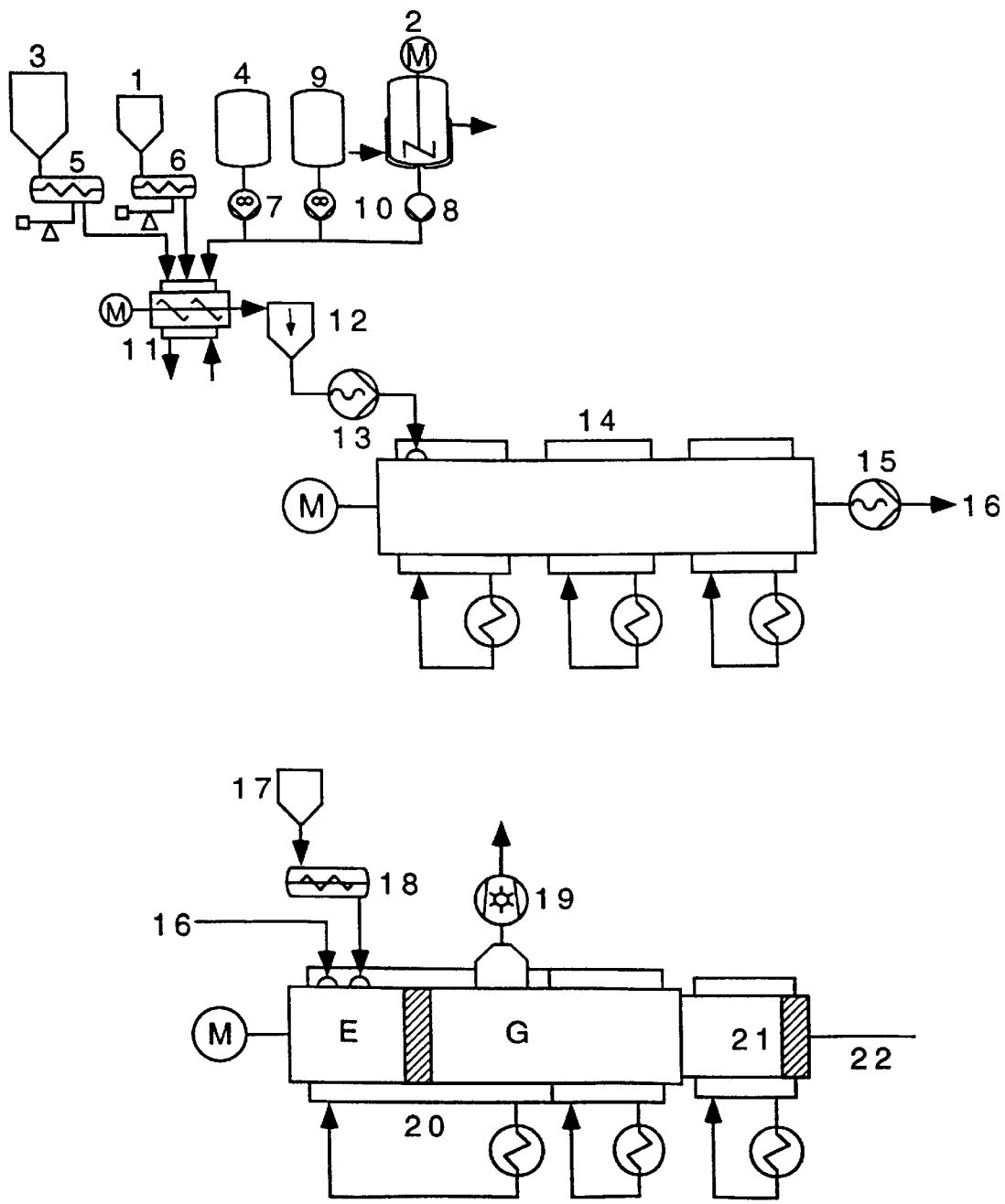

The invention relates to a process for preparing aminoplastics and/or phenolics and to the use of the process for preparing melamine resins and/or phenolic resins, in particular melamine-formaldehyde resins, urea-formaldehyde resins, phenolic resins and blends.

Aminoplastics (injection- or compression-moldings cured either directly or during the further shaping of semifinished products) have good mechanical properties, high flame retardancy, heat resistance and solvent resistance, high scratch resistance and good appearance (surface). The starting materials for preparing aminoplastics are low in price, compared with those for polyamides or other engineering plastics.

A conventional process for preparing melamine resin semifinished or finished parts has a series of steps: the starting materials are firstly precondensed batchwise in a heatable mixing vessel to give an amine-formaldehyde resin solution of about 50% strength, the resultant solution is spray-dried to give melamine-formaldehyde resin powder, the resultant resin powder is dry-mixed with fillers in, for example, a plowshare mixer in a further step, then continuously plasticized via heatable calenders to give a compound, and, in further steps, firstly comminuted coarsely, then finely ground; batches are mixed to give uniformity of color and the material is recompacted to give a free-flowing molding composition and finally injection- or compression-molded to give finished parts.

A simplified process for preparing a melamine-formaldehyde resin in a "single pass" reactor is described in U.S. Pat. No. 4,458,062. It is significant here that the starting materials are crystalline melamine and solid formaldehyde and that operations are carried out in the absence of water or any other solvent. Solid formaldehyde, however, is more expensive than aqueous formaldehyde solutions. In addition, this process gives melamine-formaldehyde resins which have properties significantly different from those of resins prepared in the presence of solvents.

DE-A 24 51 874 describes an improved process for preparing aminoplastics, in which an aqueous solution of a precondensate, with addition of pigments if desired, is passed into a fluidized-bed dryer and there sprayed onto fillers, dried, and then pelletized and used directly as molding composition.

It is an object of the present invention to provide a continuous process which permits simple and low-cost preparation of aminoplastics in a small number of steps. The novel process should moreover allow the processing and product properties of aminoplastics to be specifically adjusted within a wide range in a simple manner.

We have found that this object is achieved by means of a process in which a precondensate solution is prepared in a first extruder, the precondensate solution is continuously fed, with addition of additives, to a second extruder with partial filling in the feed section (E) and devolatilization section (G), devolatilized in the second extruder and then formed to give an end product.

It has been found that the addition of appropriately chosen additives in the second extruder makes it possible to adjust the reactivity of the resin or to make controlled improvements in product properties, such as in particular impact strength or other mechanical properties. The process moreover allows the residual moisture of the product to be adjusted in the second extruder via devolatilization systems.

In the novel process, a precondensate solution is firstly prepared in a manner known from EP-B 0 355 760, by mixing the starting materials, for example melamine and aqueous formaldehyde solution, and, if desired, paraformaldehyde, in a molar ratio melamine: formaldehyde of from 1:1.5 to 1:3, preferably from 1:2 to 1:3, if desired adding known modifiers and additives which do not disturb the condensation reaction, for example monoalcohols, diols, sulfonamides, sugars, basic catalysts, such as amines, aminoalcohols and hydroxyalkylmelamines, and precondensing them in a first extruder at from 120 to 140° C. to a degree of condensation corresponding to a viscosity rise to at least 1 Pa. s. The precondensate solution has a solids content of from 60 to 90%, preferably from 75 to 80%.

Urea-formaldehyde precondensate solutions may be prepared correspondingly from urea solutions and formaldehyde solutions, if desired with suitable additives.

A vital element of the process is a second extruder, to which is fed the precondensate solution prepared in the first extruder in a known manner. While the first extruder must be 100% filled, so that the residence time can be precisely adjusted, giving a defined degree of condensation, the second extruder must, according to the invention, be partly filled in the feed section (E) and in the devolatilization section (G). This makes it possible firstly to add directly into the second extruder additives which can be used to adjust the processing and product properties of the aminoplastics and secondly to carry out, in the second extruder, a devolatilization of the melt, which would not be possible in a completely filled extruder because of the resultant discharge of solids.

The first extruder is preferably operated in a range of rotation rates of from about 12 to 20 rotations per minute, and the second extruder preferably at from 20 to 300 rotations per minute, particularly preferably from 80 to 150 rotations per minute.

The temperature of the second extruder can be controlled section by section via temperature sensors (TIC), the settings being advantageously from 30 to 170° C., preferably from 80 to 120° C.

At the end of the second extruder, acid catalysts are added which bring about the subsequent curing of the products.

Attached to the second extruder there is equipment which brings about the forming of the end product in a suitable manner:

In a first version, the fully formulated molding composition devolatilized in the second extruder may be extruded via a multi-strand die, pelletized, given a final drying and cooled. The pellets have properties similar to those of commercially available molding compositions and may be further processed, for example by injection molding.

In a second version, a sheet die may be used at the end of the extruder, and through this the raw molding composition may be shaped to give continuous sheet. The process parameters here are adjusted so that the sheet has sufficient dimensional stability but is not yet fully cured. The resultant sheet is then calibrated and cooled. This gives a salable product which is a semifinished product capable of further processing and which may be reshaped in heatable presses to give the desired cured finished part.

In a third version, the continuous sheet is calibrated and completely cured at from 130 to 190° C., by attaching a heatable belt press downstream of the sheet die. The fully cured molding can be used in various application sectors, in particular in the electrical, building and motor vehicle sectors.

The invention is further illustrated below using the drawing and a working example.

The drawing shows in the only FIG. 1 a schematic representation of the process according to the invention:

Melamine from the storage vessel 3 and paraformaldehyde from the storage vessel 1 are fed via continuous weigh feeders 5 and 6 to the mixer 11. Liquid formaldehyde solution from the stirred storage vessel 2, diethylethanolamine from the vessel 9 and aqueous 5-hydroxy-3-oxapentylmelamine mixture from the vessel 4 are also fed to the mixer 11 via metering pumps 7, 8 and 10. The suspension is devolatilized in a vessel 12 and, via a pump 13, metered into a first heatable continuous extruder 14. Following this, the solid constituents are dissolved and the resin-like precondensate 16 is produced. The precondensate is formed as a highly viscous aqueous solution of about 80% strength.

The precondensate 16 is fed, either directly or via a metering pump 15, to a second extruder 20. Dry-mixed additives from the storage vessel 17 are also fed to the second extruder 20 via a gravimetric metering system 18. The sheet die 21 at the end of the second extruder 20 continuously shapes the molding composition to give raw sheet.

EXAMPLE

In a first extruder 14, a precondensate solution is prepared in a manner known from EP-B 0 355 760, following the formulation given in Table 1.

TABLE 1

Formulation of precondensate solution

|  | % by weight | mol % based on Σ triazine |
|---|---|---|
| Σ triazine, of which |  | 100 |
| melamine | 43.35 | 90 |
| 5-hydroxy-3-oxapentylmelamine mixture | 15.69 | 10 |
| Bisphenol A | 1.14 | 1.3 |
| Σ formaldehyde, of which |  | 200 |
| paraformaldehyde | 11.72 |  |
| formaldehyde (40%) | 28.10 |  |
| Diethylethanolamine | 0.17 | 0.4 |

Possible additives are those which alter the processing and/or product properties, for example fibrous or pulverulent inorganic reinforcing agents or fillers, such as glass fibers, metal powders, metal salts or silicates, biological reinforcing agents or fillers, such as cellulosic fibers, pulp or wood flour, elasticizers, such as acrylates, rubber, polyglycols, diols, sorbitol, sugars, pigments, UV stabilizers, reaction inhibitors, such as amines, lubricants, buffers or non-stick agents.

Table 2 gives an example of a molding composition formulation with cellulose as filler, diethylene glycol as modifier, in particular for improving crack resistance, a stearate mixture as lubricant, sodium carbonate as buffer and diallyl phthalate as non-stick agent.

TABLE 2

Molding composition formulation

|  | % by weight |
|---|---|
| 80% precondensate solution formulated as in Table 1 | 60.91 |
| Additives | Σ 39.09 |
| Cellulose (filler) | 30.46 |
| Diethylene glycol (inhibitor, plasticizer) | 4.06 |

TABLE 2-continued

Molding composition formulation

|  | % by weight |
|---|---|
| Stearate mixture (lubricant) | 2.73 |
| Soda (buffer) | 0.91 |
| Diallyl phthalate (non-stick agent) | 0.91 |

The temperature in the second extruder 20 is preferably controlled via temperature sensors (TIC), the sets being advantageously from 30 to 170° C., preferably from 80 to 120° C.

In the second extruder 20, the reaction mixture is devolatilized via a vacuum pump, making it possible to adjust the residual moisture of the molding composition, preferably in a range of from 8 to 15%. The sheet die 21 at the end of the second extruder 20 continuously shapes the molding composition to give raw sheet, which cures in a positive mold at 140° C. within from 0.5 to 10 minutes, preferably within from 1 to 3 minutes.

The shaped and cured sheets were tested for flexural strength and impact strength. For comparison, a commercially available melamine-formaldehyde molding composition ®MF 152 from Raschig is cured within 5 minutes in a positive mold at 140° C. and its mechanical properties determined. The material quality standardized in DIN 7708-152 N was achieved.

TABLE 3

Mechanical properties

|  | Flexural strength according to DIN 53452 N/mm$^2$ (23° C.) | Impact strength according to ISO 179 kJ/m$^2$ (23° C.) |
|---|---|---|
| Molding from working example | 102 | 6.6 |
| Molding from molding composition ® MR 152, Raschig | 76 | 4.8 |

We claim:

1. A process for preparing aminoplastics and/or phenolics, wherein a precondensate solution (16) of aminoplastics and/or phenolic is prepared in a first extruder (14), continuously feeding the precondensate solution (16), with addition of additives to a second extruder (20) which has a feed section (E) and a devolatization section (G), partially filling in the feed section (E) and the devolatization section (G) of the second extruder with precondensate solution (16) from the first extruder (14), devolatizing the precondensate solution in the devolatizing section (G) of the second extruder (20), and forming the devolatilized precondensate from the second extruder into an end product.

2. A process as claimed in claim 1, wherein the first extruder is operated in a range of rotation rates of from 12 to 20 min$^{-1}$ and the second extruder in a range of rotation rates from 20 to 300 min$^{-1}$.

3. A process as claimed in claim 2, wherein the second extruder is operated in a range of rotation rates from 80 to 150 min$^{-1}$.

4. A process as claimed in claim 1, wherein the second extruder (20) is heated.

5. A process as claimed in claim 1, wherein the second extruder (20) is heated at from 30 to 170° C.

6. A process as claimed in claim 1, wherein the second extruder (20) is heated at from 80 to 120° C.

7. A process as claimed in claim 1, wherein the residual moisture is adjusted in the second extruder to a range of 8 to 15% by weight of water.

8. A process as claimed in claim 1, wherein the end product is a molding composition.

9. A process as claimed in claim 1, wherein the end product is a semifinished product capable of further shaping.

10. A process as claimed in claim 1, wherein the end product is a finished part.

11. A process as claimed in claim 1, wherein melamine resins are prepared.

12. A process as claimed in claim 11, wherein melamine-formaldehyde resins are prepared.

13. A process as claimed in claim 1, wherein a ureaformaldehyde resin is prepared.

* * * * *